United States Patent [19]

Hayes et al.

[11] Patent Number: 4,612,877
[45] Date of Patent: Sep. 23, 1986

[54] MULTIPLE PURPOSE ANIMAL EAR TAG SYSTEM

[76] Inventors: Norman J. Hayes, 36 Rd. 2, ABN, Cody, Wyo. 82414; Richard J. Shaw, 13525 W. Keefe Ave., Brookfield, Wis. 53005

[21] Appl. No.: 675,529

[22] Filed: Nov. 28, 1984

[51] Int. Cl.$^4$ .................. A01K 13/00; G09F 3/00
[52] U.S. Cl. .................................... 119/156; 40/301
[58] Field of Search ............... 119/156; 40/301, 1.5

[56] References Cited

U.S. PATENT DOCUMENTS

| | | | |
|---|---|---|---|
| 2,832,161 | 4/1958 | Murphy | 40/1.5 |
| 3,956,840 | 5/1976 | Melin | 40/301 |
| 3,958,353 | 5/1976 | Hayes | 40/301 |
| 4,317,990 | 3/1982 | Zmokly et al. | 40/301 X |
| 4,428,327 | 1/1984 | Steckel | 119/156 |

FOREIGN PATENT DOCUMENTS 2316676  1/1977  France .......................... 40/301

Primary Examiner—Hugh R. Chamblee
Attorney, Agent, or Firm—Klaas & Law

[57] ABSTRACT

An ear tag assembly comprising an identification member and an attachment member wherein the identification member comprises an identification portion located in front of an animal ear, a flexible strap portion extending through a slit in the animal ear and a slot in the attachment member, a head portion on the end of the strap portion for retaining engagement with the attachment member, a connecting portion between the identification portion and the strap portion for holding a signal sending device, and an insecticide tag holding device on said identification portion.

33 Claims, 16 Drawing Figures

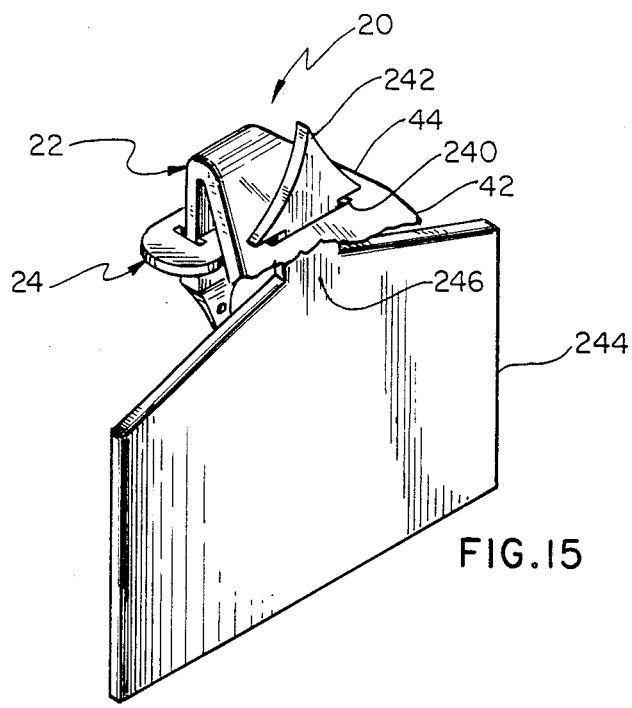
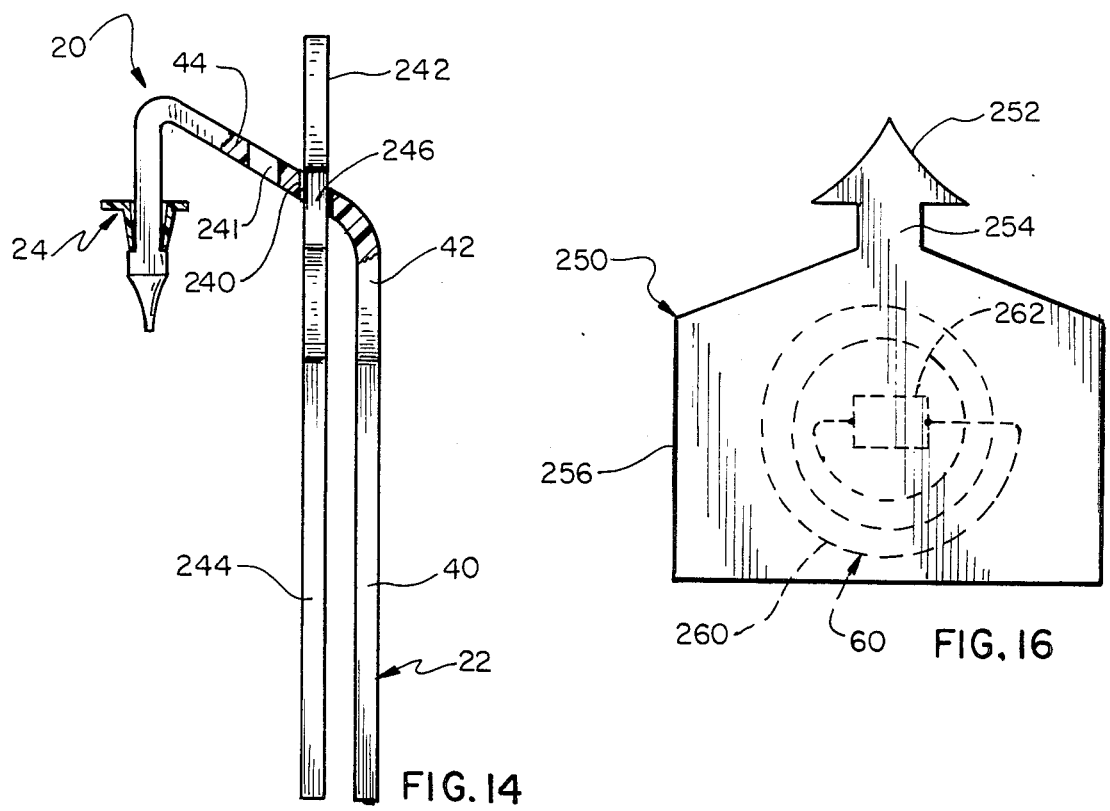
FIG. 15
FIG. 14
FIG. 16

MULTIPLE PURPOSE ANIMAL EAR TAG SYSTEM

BACKGROUND AND SUMMARY OF INVENTION

This invention relates to animal ear tags, and more particularly, to a multiple purpose ear tag assembly comprising a main tag member and a tag attachment member and which may include an insecticide member and attachment means, and an electronic identification signal generating means.

Various problems and prior art solutions related to animal identification tags and tag applicators are discussed in prior U.S. Pat. Nos. 3,260,007; 3,896,577; 3,958,353; 4,102,073; 4,121,591 and 4,147,168, the disclosures of which are incorporated herein by reference.

In general, the present invention relates to two piece tag assemblies wherein there is an identification member and a connecting member which are made of molded plastic material. In addition, the tag assembly is of a type adapted to be mounted in the relatively thick upper central portion of the ear of the bovine animal species as generally described in U.S. Pat. Nos. 3,958,353 and 4,102,073 which disclose stand-up type ear tags of particular characteristics mounted on an animal ear in a particular manner. The present invention comprises a tag assembly which is constructed and arranged not only to be mounted in the preferred location disclosed in the afore identified patents but which is also of the "hang-down" type, rather than the "stand-up" type, and employs a flexible connecting means rather than a rigid connection means. In order to enable utilization of a "hang-down" type tag assembly in the preferred attachment location on the animal ear, the present invention involves the use of an one piece identification member having an intermediate portion generally conforming to the upper front surface of the animal ear so as to enable the identification portion to hang downwardly in front of the animal ear. In this manner, the identification member is readily viewable in front of the animal ear while also being protected from engagement with foreign objects such as fence wires and posts, stall frames, trees and branches, ropes, etc. because of its location immediately in front of the animal ear pocket. In addition, the construction and arrangement of the identification member facilitates the use of an electronic identification signal sending means mounted on the identification member. For example, a low range electronic identification device may be mounted on the identification member and be in proper operational position as the animal places its head into a feeding or watering bowl or trough having an electronic identification signal receiving means for receiving identification signals from the electronic identification signal sending means. The present invention also provides for attachment of an insecticide carrying member. A relatively thin flexible generally flat connecting strap means is provided on the identification member rather than a connecting means in the form of a relatively large rigid round shaft portion with an enlarged conical head portion. In this manner, there is less strain on the animal ear and less likelihood of loss of the identification member in use.

Another feature of the present invention is the provision of an one piece tag attachment member which is constructed and arranged to be located inside the animal ear with a central slot adapted to enable a portion of the flat connecting strap means to extend therethrough and resilient flexible retaining means in juxtaposition to the central slot for retainingly engaging a head portion on the end of the strap means. Other advantages and features of the invention are described hereinafter. While the ear tag assembly and system of the present invention has particular utility for use with cattle, it is contemplated that the invention may be used for other kinds of domestic and non-domestic animals.

BRIEF DESCRIPTION OF DRAWINGS

Illustrative and preferred embodiments of the invention are shown by the accompanying drawings in which:

FIG. 11 is a top view of the tag retaining member of the ear tag assembly of FIG. 4;

FIG. 12 is a bottom view of the tag retaining member of FIG. 11;

FIG. 13 is a side view of the tag retaining member of FIG. 11;

FIG. 14 is a cross-sectional side elevational view of an alternative form of the identification member and the insecticide tag member;

FIG. 15 is a perspective view of a portion of the assembly of FIG. 14; and

FIG. 16 is a front elevational view of an identification signal sending attachment tag.

DETAILED DESCRIPTION

Figure 1:
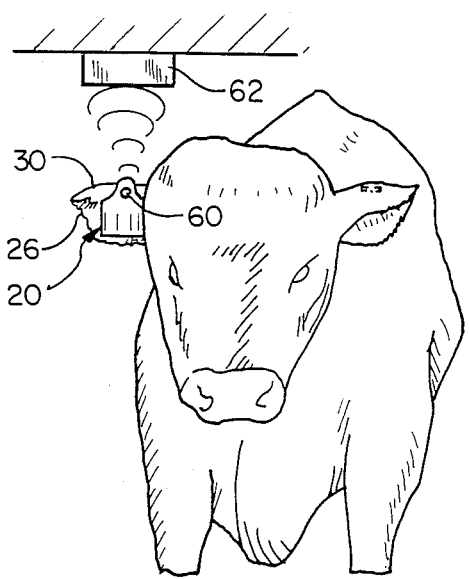
FIG. 1 is a schematic front view of an animal with an ear tag assembly of the present invention.
Figure 2:
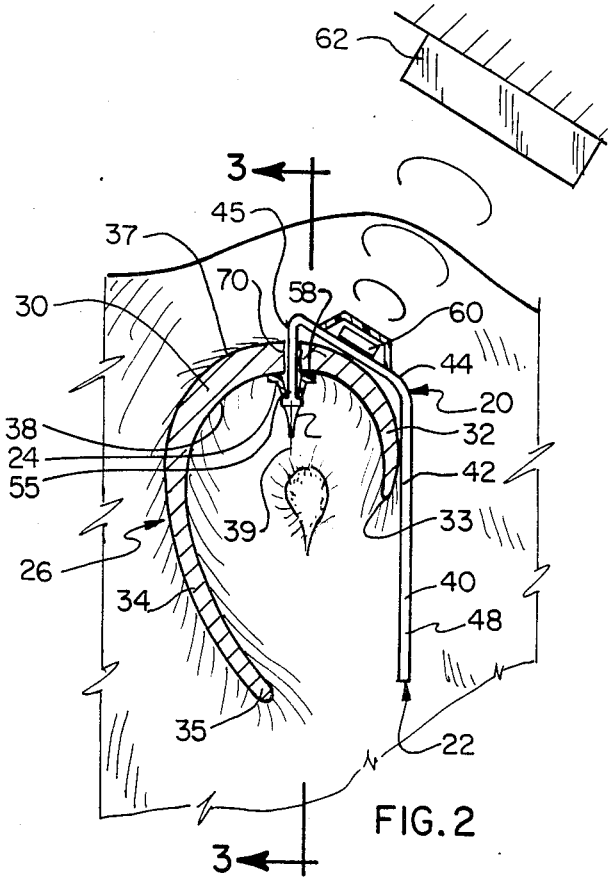
FIG. 2 is an enlarged side view, partly in section, of the animal ear and ear tag assembly of FIG. 1.
Figure 3:
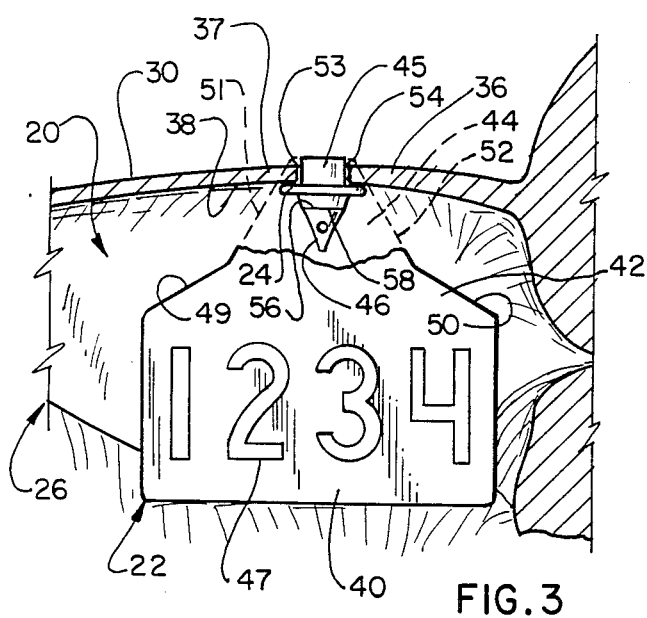
FIG. 3 is a front view, partly in section, of the animal ear and ear tag assembly of FIG. 2.

In general, the two piece ear tag assembly 20 of the present invention comprises an identification member 22 made of one piece of resilient molded plastic material, such as polyurethane 2102A Upjohn, and an attachment member 24 made of one piece of relatively rigid, but also resilient molded plastic material such as Nylon which are adapted to be mounted on the ear 26 of a bovine type animal as shown in FIGS. 1-3.

The terms "vertical", "upper", "lower", "upwardly", "downwardly", "forwardly", "rearwardly", "inner", "outer" and related terms used in this specification and the appended claims refer to the normal position of the tag assembly when mounted on the ear of an animal.

While the inventive concepts are applicable to various kinds of animals, the present tag assembly is particularly adapted for use with animals of bovine species. As generally illustrated in FIGS. 1-3, the ear of bovine type animals comprises a generally horizontally extending upper portion 30 which interconnects a relatively short vertically downwardly extending front lobe portion 32 terminating in a lower anterior border 33 and a relatively long vertically downwardly extending rear lobe portion 34 terminating in a posterior border 35. In general, the ear tapers outwardly and is relatively thin at the outer edges. There is an area 36 of the animal ear closely adjacent the animal head which is particularly well suited for mounting of the animal tag assembly of the present invention. The area 36 is located along the ear portion 30 approximately one-third the distance from the juncture of the ear and the animal head to the outer end of the ear. The area 36 is characterized by being composed of relatively thick and dense material while providing a relatively flat generally horizontally extending upwardly facing outer surface 37 and a relatively flat generally horizontally extending downwardly facing inner surface 38. In addition, an inner pocket 39 is provided between the front and rear lobe portions 32, 34 which is relatively free of hair whereas an abundance of hair is often found at other areas of the ear which often obscures the conventional hanging tags of the prior art.

Figure 4:
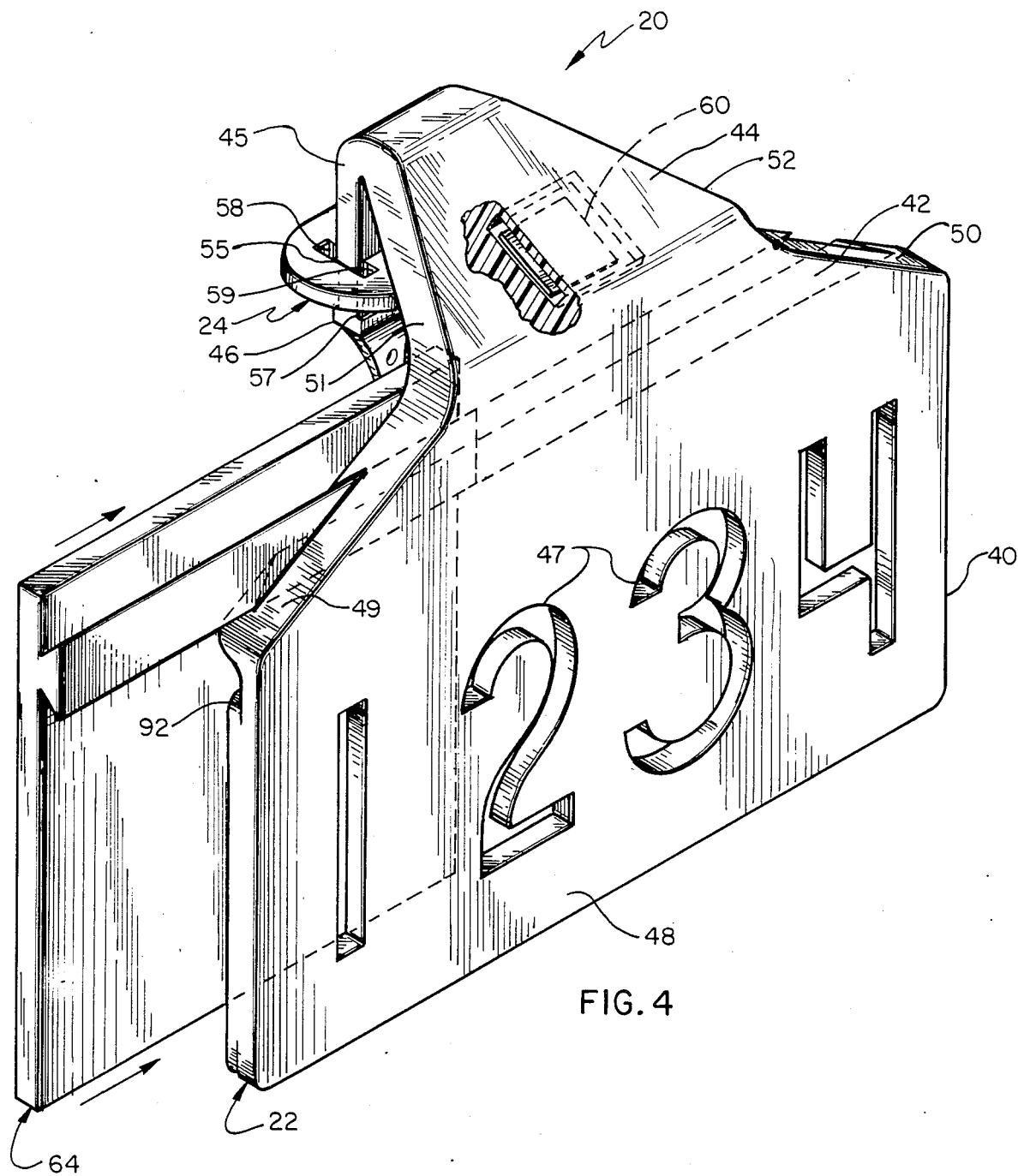
FIG. 4 is a perspective schematic view of a presently preferred embodiment of an ear tag assembly of the present invention.
Figure 5:
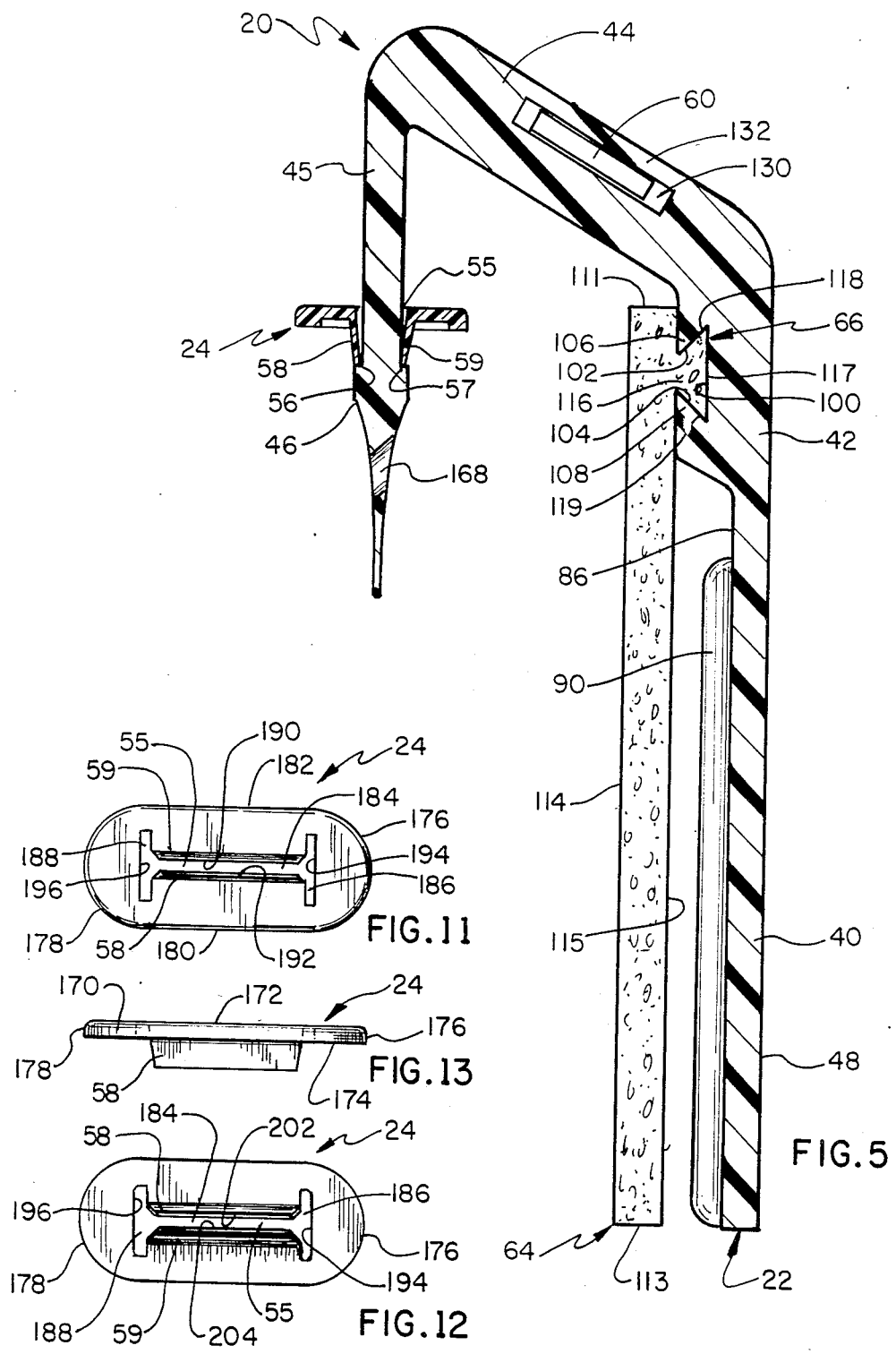
FIG. 5 is an enlarged cross-sectional view of the ear tag assembly of FIG. 4.

In general, the identification member 22 comprises a flat relatively thin enlarged identification portion 40 having a generally polygonal peripheral configuration, a first reduced tapered width vertically extending intermediate connecting portion 42, a second further reduced tapered width rearwardly inclined intermediate portion 44, a narrow width vertically downwardly extending strap portion 45 and an enlarged connecting head portion 46 which is connectably associated with attachment member 24. The identification portion 40 is adapted to bear suitable visual identifying indicia 47 applied to a forwardly facing front marking surface 48 in any suitable manner such as by ink images or hot stamping or by slots cut through the identification portion. The identification portion 40 is located in a generally vertical attitude below the anterior border 33 of the front lobe portion 32 in forwardly spaced relationship to the posterior lobe portion 34. The first intermediate connecting portion 42 has a truncated pyramidal shape and extends vertically upwardly with side edge surfaces 49, 50 inclined from the identification portion 40 at an angle of approximately 30° to 45°. The second intermediate connecting portion 44 extends upwardly and rearwardly from connecting portion 42 at an angle of approximately 30° to 60° along the top surface of the animal ear with inwardly tapered side edge surfaces 51, 52. Strap portion 45 has parallel side edge surfaces 53, 54 and extends downwardly through a vertical slit 70 in the animal ear area 36, and through a central vertical passage 55, FIG. 5, in attachment member 24. Head portion 46 is located below attachment member 24 with upwardly facing abutment surface means 56, 57, FIG. 5, engaging downwardly facing lower surface abutment means on flexible rib portions 58, 59 of attachment member 24. A conventional active or passive electronic signal sending means 60 may be suitably mounted on or attached to the identification member 22. In one embodiment, means 60 is mounted on upwardly rearwardly inclined connecting portion 44 for sending a coded electronic identification signal to an electronic signal receiving means 62. As shown in FIGS. 4 & 5, an attachment tag member 64 made of a conventional insecticide material may be attached to identification member 22 by suitable attachment means 66.

Referring now to FIGS. 4-13, identification portion 40 has a generally rectangular peripheral configuration defined by a bottom edge surface 80 and side edge surfaces 82, 84 with a flat front surface 48 and a generally flat rear surface 86. A plurality of vertically extending equally laterally spaced reinforcement rib portions 88, 89, 90, 91, 92 may be provided on rear surface 86 to stiffen and maintain the rectangular peripheral configuration of the identification portion while providing a plurality of numeral spaces 93, 94, 95, 96 therebetween wherein slotted numerals 47 may be provided by an automatic cutting tool and die arrangement during manufacture, or by a punch-type hand tool used by a sales distributor or by a tag user such as a rancher or farmer. The use of slotted numerals, which can be applied by the tag user, can reduce cost and enable the tag user to select any numeric identification system best suited for individual user needs. In the illustrative embodiment, the identification portion has a width of approximately 3 inches, as measured between side edge surfaces 82, 84, a height of approximately 1⅜ inches as measured from bottom edge surface 80 to intermediate portion 42, and a thickness of approximately 0.065 inch as measured between side surfaces 48, 86. Rib portions 88-92 have a thickness of approximately 0.065 inch and a width of approximately 3/32 inch.

Figure 6:
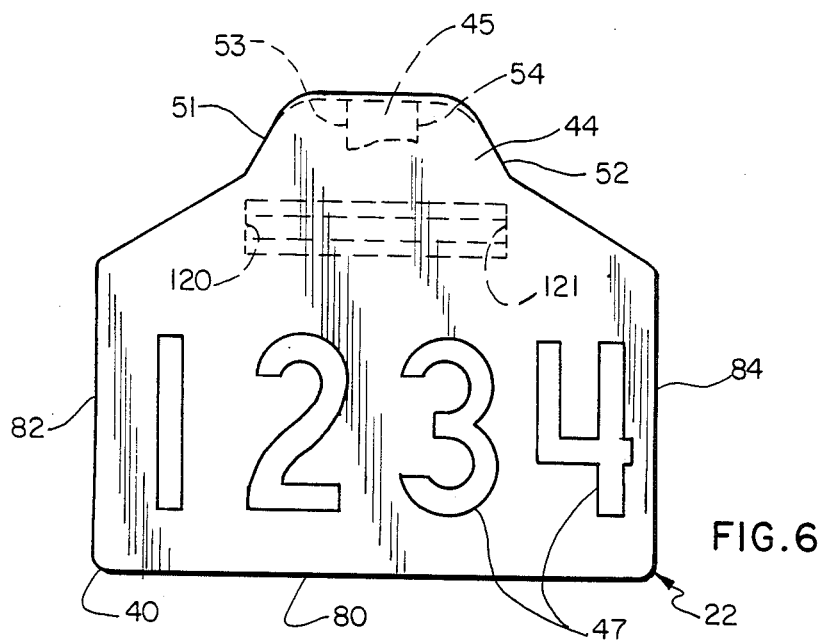
FIG. 6 is a front view of the identification tag member of the ear tag assembly of FIG. 4.
Figure 7:
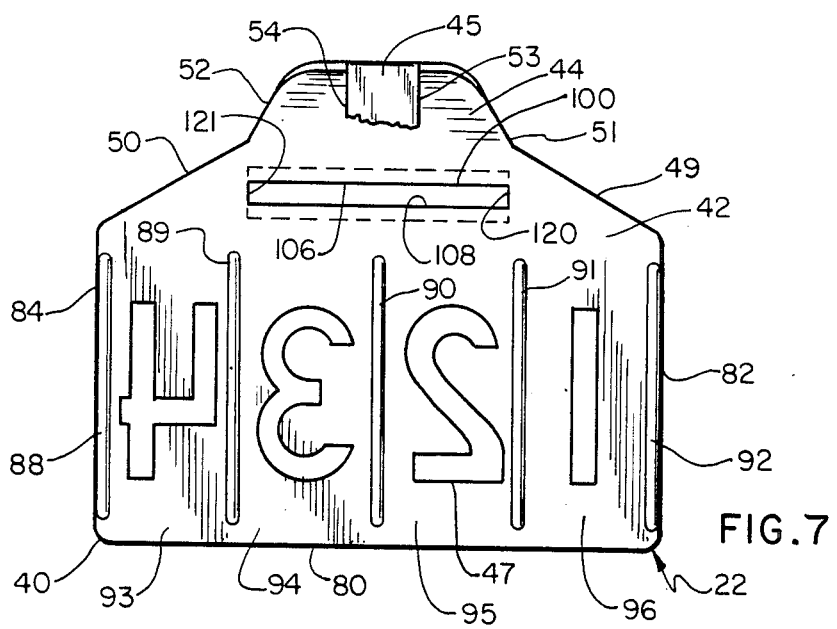
FIG. 7 is a rear view of the identification member of FIG. 6.
Figure 10:
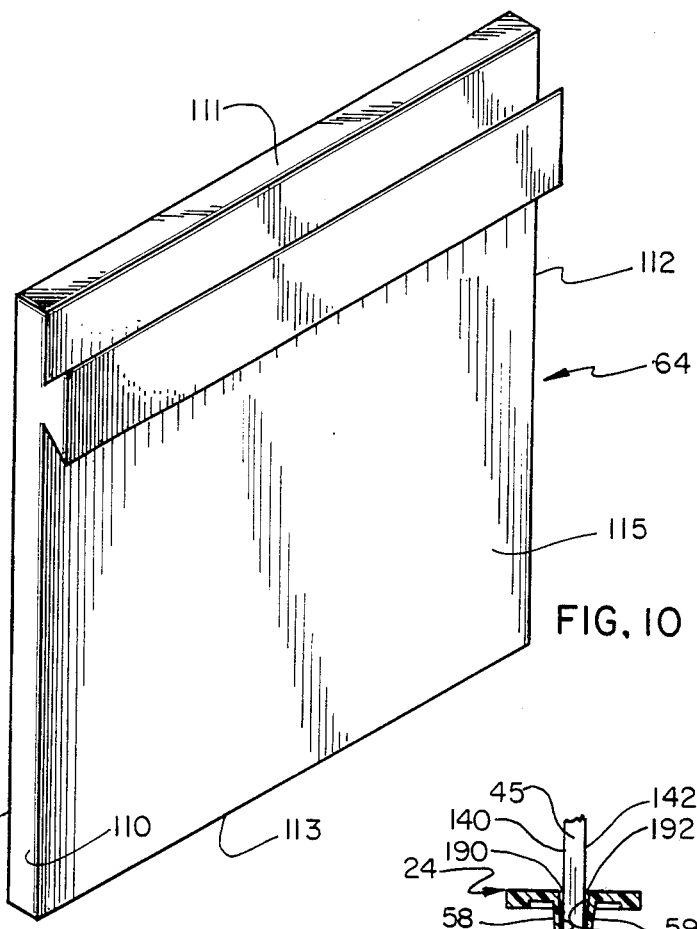
FIG. 10 is a perspective view of an insecticide tag member of the ear tag assembly of FIG. 4.
Figure 9:
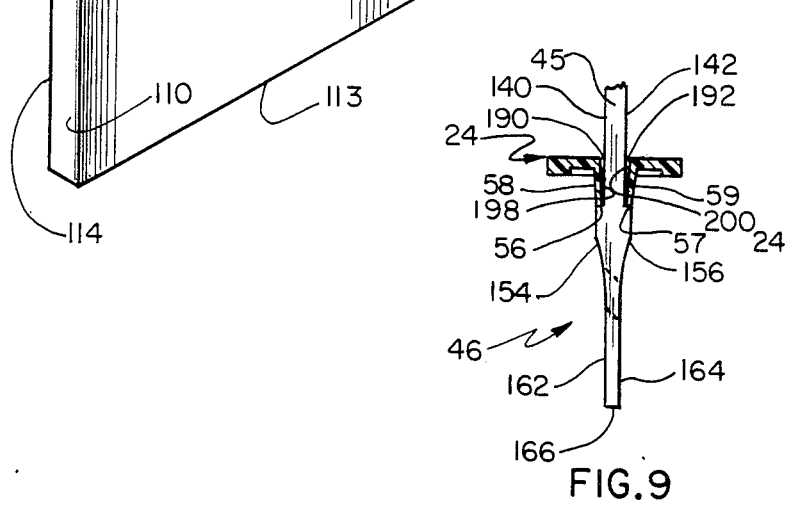
FIG. 9 is another side view of the tag attachment means of FIG. 8.

Intermediate connecting portions 42, 44 may be of increased thickness (e.g. 0.195 to 0.325 inch) relative to identification portion 40 to enable mounting of the signal sending means 60 and insecticide tag means 64. Portion 42 may have a height of approximately 9/16 inch and a width at the junction with portion 44 of approximately 1¾ inches. The insecticide tag attachment means 66, FIG. 5, may comprise an elongated slot defined by a flat bottom surface 100 and a pair of inclined side surfaces 102, 104 on flexible lip portions 106, 108 integrally molded in portion 42. Insecticide tag means 64 comprises a rectangular block-shape piece of conventional extrusion molded resilient flexible plastic (e.g., PVC) and insecticide material having side edge surfaces 110, 111, 112, 113 and flat side surfaces 114, 115, as shown in FIG. 10 which is die cut from a continuous strip. The insecticide tag attachment means 66 further comprises an integrally molded elongated rib portion 116 having a flat outer side surface 117 and inclined side surfaces 118, 119 which correspond to slot surfaces 100, 102, 104 so as to enable rib portion 116 to be inserted in and removed from the slot. Insertion of the rib portion may be accomplished by lateral sliding movement as illustrated in FIG. 4 or by transverse movement toward the slot which may have transverse side walls 120, 121 as illustrated in FIGS. 6 and 7. The insecticide tag attaching means may also comprise a removable pin and hole arrangement such as shown in the afore-identified patents for connecting a stand-up identification tag member to an attachment member.

Upper inclined intermediate enlarged thickness portion 44 includes identification signal sending device retaining means in the form of a pocket or chamber 130 which is covered by a plastic flap portion 132. The signal sending means 60 may be placed in pocket 130 after molding of the identification tag member 40 with the pocket therein or the identification tag member portion 44 may be integrally molded therearound. Flap portion 132 may be an integrally molded part of the identification tag member as shown in FIG. 5, or may be a separate part which is heat sealed or adhesively fixed to intermediate portion 44 as shown in FIG. 2. In any event, the construction and arrangement is preferably such that the identification signal reading device is removably and replaceably mounted on the identification tag member 40.

In one presently proposed embodiment of the invention, the identification signal generating means 60 on the ear tag is a conventional electronic chip device with conventional miniaturized electronic circuitry and an antenna which is capable of receiving activating electromagnetic energy and responding thereto by emitting a coded radio frequency digital signal. The identification signal receiving means is a conventional device which generates electromagnetic energy for actuating the identification signal generating means and which is capable of receiving, decoding, transmitting an analog signal. Both the identification signal generating means and the identification signal receiving and transmitting means may be of the same general design as apparatus currently manufactured and sold by B.I. Corporation of Boulder, Colo., and described in U.S. Pat. No. 4,475,481, the disclosure of which is incorporated herein by reference; but may also be other designs including the type wherein the signal generating means is battery operated and does not depend on receipt of activating energy from the signal receiving means. The identification signal receiving means 62 activates the ear tag signal generating means 60 by transmitting an electromagnetic field burst of fixed duration. The signal generating means 60 acquires energy from the field and responds by transmitting back to the generating means a radio frequency digital coded message signal which contains the unique number programmed into the electronic chip device. The generating means receives the coded signal and conditions it into a data signal that can be sent to electronic data processing means.

The animal identification signal transmitting means 60 may be encased in plastic, is of relatively small size, e.g., approximately 15 to 25 mm×15 to 25 mm×3 to 5 mm, or less, and of relatively low weight, e.g., 5 to 10 grams. The range of transmission of both the transmitting means and the receiving means is preferably limited to approximately between six inches to 3 feet, and the data storage capacity is approximately at least twenty to thirty binary digits (bits) of data plus other digits for preamble and parity (error detection) so that the system allows for up to 1,000,000 or more different unique codes which may be programmed into the electronic chip during manufacture.

Connecting strap portion 45 preferably has the same thickness, e.g., approximately 0.065 inch, as identification portion 40 as measured between opposite flat side surfaces 140, 142, a width of approximately $\frac{5}{8}$ inch as measured between opposite parallel edge surfaces 153, 154, and a length of approximately $\frac{3}{4}$ inch as measured from intermediate portion 44 to head portion abutment surface means 56, 57. Head portion 46, FIGS. 8 & 9, has an upper enlarged portion defined by opposite edge surfaces 150, 152, which are coplanar with strap edge surfaces 53, 54 and opposite flat upper side surfaces 154, 156 which are laterally outwardly offset from strap side surfaces 140, 142 to provide abutment means 56, 57. A lower reduced size arrow-head-like portion is defined by opposite inwardly curved edge surfaces 158, 160, opposite flat side surfaces 162, 164 and an end edge surface 166. An inclined passage 168 extends between surfaces 162, 164 for a purpose to be hereinafter described.

Figure 8:
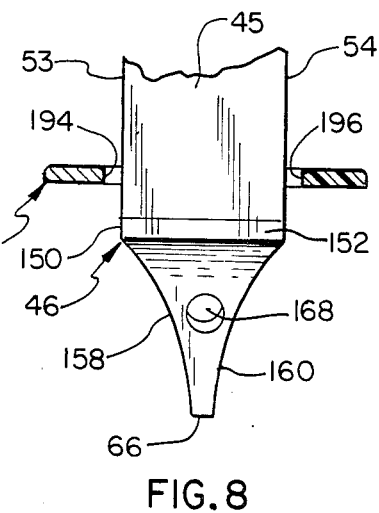
FIG. 8 is a side elevational view, partly in cross-section of the tag attachment means of the ear tag assembly of FIG. 4.

As shown in FIGS. 11-13, retaining member 24 comprises a general flat base portion 170 having an oval peripheral configuration defined by opposite parallel flat upper and lower side surfaces 172, 174, opposite curved edge surfaces 176, 178, and opposite parallel edge surfaces 180, 182. Upper side surface 172 is engageable with the lower surface of the animal ear. Central slot means 55 has an I-shape peripheral configuration defined by a central slot portion 184 and opposite transverse end slot portions 186, 188. The upper opening width of slot portion 184, as measured between side surfaces 190, 192 is slightly larger than the thickness of head portion 46 as measured between side surfaces 154, 156 to enable the largest part of head portion 46 to freely pass therethrough. The length of slot portion 184 as measured between end surfaces 194, 196, FIG. 8, is substantially larger than the maximum width of head portion 46 as measured between surfaces 150, 152. Resilient rib portions 58, 59 are inwardly inclined toward one another with tapered oppositely spaced side surfaces 198, 200, FIG. 9, normally defining a lower opening having a width as measured between lower edge abutment surfaces 202, 204, less than the thickness of upper head portion 46 but greater than thickness of lower head portion 46. Thus, head portion 46 may be forced through the slot by resilient outward deflection of rib portions 58, 59 which then resiliently inwardly deflect to engage abutment ledge means 56, 57 whereby the head portion 46 may not be withdrawn through the slot after assembly on the animal ear. However, the construction and arrangement is such as to permit limited relative movement between the retaining member and the head portion and the strap portion in various directions to avoid breakage and irritation.

In manufacture of the identification member 22, the entire member may be injection molded in the configuration illustrated in FIGS. 2 & 5. In assembly and mounting of the identification member 22 and the attachment member 24, a two-jaw plier-type attachment tool may be utilized as described in my prior patents with the identification member being mounted on one jaw in association with a reciprocable cutting knife blade for cutting the ear slit and the attachment member being mounted on the other jaw. Hole 168 in head portion 46 is constructed and arranged to receive an inclined pin on the cutting blade so as to carry the head portion through the slit and the slot means 55 and then release the head portion as the blade is retracted back through the slot means and the slit. The identification tag member 22 may be mounted on the jaw in a general flat position due to the resilient flexibility of the material. The cutting blade cuts through the animal ear to provide slit 54 and carries the head portion 46 and strap portion through the slit and through the slot in the attachment member. Upon release of the identification member and the attachment member from the plier jaws, the resiliency of the identification tag member causes it to resume the configuration shown in FIGS. 2 & 5 on the animal ear.

In the assembled and mounted position of FIGS. 1-5, the identification portion 40 hangs downwardly in a vertical attitude with the visual identification indicia 47 facing forwardly in clear view. Intermediate portion 44 extends upwardly and rearwardly to locate the identification signal sending means 60 in ideal position for transmitting short range electronic identification signal to signal receiving means 62. In this manner, signal sending means 60 and signal receiving means can be close-coupled in the operational state without interference between signal sending means on different animals in relatively close proximity to one another or signal receiving means located in relatively close proximity to one another. For example, in one use of the present invention, a system is provided for identifying a particular animal among a group of animals and controlling placement, processing or treatment of that particular animal in accordance with pre-established criteria. In general, the system comprises the use of a stall with a water bowl at one end and an entrance opening at the other end whereby an animal will enter the stall to drink. An entrance gate is automatically operable from a normally open position to a closed position to confine the animal in the stall upon generation of a gate closing signal. An exit gate located at the water bowl end of the stall is automatically operable from a normally closed position to an open position upon receipt of a gate opening signal to provide an exit from the stall to a retaining pen adjacent the stall. In this manner, selected individual animals of a group of animals that normally water in the stall at various times on a random basis may be selectively directed into the retaining pen for any of a variety of reasons.

The presently preferred embodiment of the invention, as used with cattle in a feedlot or on a ranch or a farm, comprises an ear tag which is attached to one ear of each animal in the group of animals. Each ear tag has a visible different identification number thereon so that each particular animal may be visually identified from the other animals. In addition, each ear tag has an electronic signal generating device which is operable to generate a coded identification signal different from any coded identification signal generated by any other device on any other animal. An electronic signal receiving device is mounted in juxtaposition to each of a plurality of water bowls in each of a plurality of stalls to receive the coded identification signal whenever an animal is watering in the stall so as to enable identification of each animal in any stall.

If the insecticide tag means 64 is used, it may be attached to the identification tag member 22 after assembly with the attachment member 24 on the animal ear. Rib portion 116 is pressed into groove 100 by resilient deflection of lip portions 106, 108 which snap back to the position shown in FIG. 5 to hold the insecticide tag in parallel downwardly extending relationship to identification portion 40. The insecticide tag member may be removed and replaced as necessary or desirable.

FIGS. 14 & 15 show an alternative construction and arrangement wherein the identification member 20 is provided with one or more elongated slots 240 in intermediate portion 44 to enable passage therethrough by resilient deflection of enlarged attachment head portion 242 of an insecticide tag member 244 having a reduced neck portion 246. FIG. 16 shows an alternative construction and arrangement for supporting the signal generating means 60 on a molded plastic attachment tag member 250 having an enlarged attachment head portion 252, a neck portion 254 and a body portion 256 similar to the insecticide tag member of FIGS. 14 & 15. A loop type wire or ribbon type antenna means 260 and printed circuity and/or integrated circuit micro-chip type identification signal generating means 262 are mounted in or on body portion 256. The signal sending attachment tag member 250 is mounted on the identification member in the same manner as described with respect to the insecticide tag member. If both the signal sending attachment tag member and the insecticide tag member are to be used at the same time, a plurality of slots 240, 241 may be provided in intermediate portion 44 or attachment slot means may be provided in intermediate portion 42.

While illustrative and presently preferred embodiments of the inventive concepts have been disclosed herein, the inventive concepts may be otherwise variously embodied and it is intended that the appended claims be construed to include alternative embodiments except as limited by the prior art.

The invention claimed is:

1. An ear tag assembly for mounting on the ear of a bovine-type animal or the like having an upper ear portion, a rear end portion, and a front ear portion with a central pocket beneath said upper ear portion between said front ear portion and said rear ear portion, and the assembly comprising:

a one-piece tag retaining member made of molded plastic material having a generally flat upper surface for engaging an inner surface of the upper ear portion, with a generally vertically extending central slot means therein and a flexible lip means adjacent said central slot means, adapted to be located in the central pocket of the animal ear in a substantially horizontal attitude opposite a generally vertically extending slit in the upper ear portion of the animal ear; and a one piece identification member made of flexible plastic material with an enlarged identification portion located in front of the animal ear, in downwardly generally vertically extending relationship to the upper ear portion, an intermediate portion of reduced width relative to said identification portion and located adjacent the upper ear portion and the front ear portion; a generally vertically downwardly extending strap portion of reduced width relative to said intermediate portion extending through the generally vertically extending slit in the animal ear and the generally vertically extending central slot means in said one piece tag retaining member, and a generally vertically downwardly extending head portion located below the upper ear portion and mounted in abutting engagement with said flexible lip means and located below a generally horizontally extending portion of said one piece tag retaining member located below the upper ear portion.

2. The invention as defined in claim 1 and further comprising:

a generally vertically downwardly extending insecticide member attached to a rear portion of said identification member and extending downwardly in rearwardly spaced generally parallel relationship thereto.

3. The invention as defined in claim 2 and further comprising:

releasable attaching means for attaching said insecticide member to said identification member.

4. The invention as defined in claim 3 and wherein said releasable attaching means comprising:

a groove in one of said members; and
   a rib in the other of said members.

5. The invention as defined in claim 1 and further comprising:

a signal sending means mounted on said identification member for sending an electronic identification signal.

6. The invention as defined in claim 1 and wherein said retaining member comprising:
a base portion having a thickness such as to be relatively inflexible; and
a pair of relatively thin flexible flange portions located on opposite sides of said central slot means for flexible outward movement to enable passage of said head portion therethrough in one direction and flexible inward movement after passage of said head portion therethrough to thereafter prevent passage therethrough in the opposite direction.

7. The invention as defined in claim 1 and wherein:
said head portion having a pair of tapered edge portions terminating in a tip portion and flat opposite tapered side portions with a maximum width approximately equal to the width of said strap portion and a thickness greater than the thickness of said strap portion to provide a pair of transverse shoulder means between said head portion and said strap portion;
said retaining member a relatively rigid base portion and said central slot means having opposite elongated side edge portions and relatively short length end portions and being located in said base portion and having a length and width slightly larger than the width and thickness of said head portion to enable said head portion to freely pass therethrough; and
a pair of oppositely spaced flexible flange portions located along said opposite side edge portions of said slot means and extending downwardly transversely from said base portion and normally defining a slot therebetween of lesser width than said head portion and being flexibly resiliently outwardly deflectable to enable passage of said head portion therethrough and thereafter flexibly resiliently inwardly displaceable to abuttingly retainably engage said shoulder means for prevent withdrawal of said head portion through said slot means.

8. The invention as defined in claim 1 and wherein said identification portion extending vertically downwardly in a first plane from one end of said intermediate portion and said strap portion extending downwardly from the other end of said intermediate portion in a second plane spaced from and being substantially parallel to said first plane.

9. The invention as defined in claim 8 and wherein:
said intermediate portion being of substantially greater thickness than said identification portion and said strap portion.

10. The invention as defined in claim 9 and wherein said intermediate portion has a first lower part in the same plane as said identification portion and a second upper part extending transversely between said first part and said strap portion.

11. The invention as defined in claim 10 and further comprising:
an insecticide tag member; and
an insecticide tag attaching means for attaching said insecticide tag member to said identification tag member.

12. The invention as defined in claim 11 and wherein said insecticide tag attaching means comprises tongue means and retaining groove means.

13. The invention as defined in claim 12 and wherein: one of said tongue means and said groove means being located on said first lower part of said intermediate portion of said identification tag member;
the other one of said tongue means and said groove means being located on an upper part of said insecticide tag member; and
said tongue means and said groove means being constructed and arranged to hold said insecticide member in downwardly extending generally parallel relationship to said identification portion.

14. The invention as defined in claim 13 and wherein:
said groove means is located in said first lower part of said intermediate portion; and
said tongue means is located on said insecticide tag member.

15. The invention as defined in claim 14 and wherein:
said groove means comprises an elongated slot on said lower part and having a bottom surface and inclined side flange surfaces on flexible side wall portions; and
said tongue means comprises an elongated rib on said insecticide tag and having a front surface corresponding to said bottom surface and inclined side wall surfaces corresponding to said inclined side flange surfaces.

16. The invention as defined in claim 10 and further comprising:
a signal sending means for sending a unique coded signal for identification of an animal; and
mounting means for said signal sending means on said upper part of said intermediate portion of said identification tag member.

17. The invention as defined in claim 16 and wherein said mounting means comprising:
a pocket means within said upper part of said identification tag member for holding said signal sending means in upwardly forwardly inclined relationship to said identification portion of said identification tag member.

18. The invention as defined in claim 17 and further comprising:
a cover means associated with said pocket means for confining said signal sending means in said pocket means.

19. The invention as defined in claim 18 and wherein said cover means comprising:
a relatively thin layer of plastic material having edge portions sealed to said upper part of said intermediate portion of said identification tag member.

20. The invention as defined in claim 16 and further comprising:
a signal receiving means for receiving a unique coded signal from said signal sending means for identification of an animal having an ear tag assembly mounted on the animal ear; and
mounting means for said signal receiving means for fixedly locating said signal receiving means in direct alignment and close proximity to said signal sending means when the animal places its head in juxtaposition thereto.

21. The invention as defined in claim 1 and further comprising:
animal identification indicia means on the front surface of said identification portion of said identification member for visual identification of the animal.

22. The invention as defined in claim 21 and wherein said animal identification indicia means comprising:

a plurality of numeric slot means extending through said identification portion in the shape of numerals for providing various combinations of identifying numbers.

23. The invention as defined in claim 22 and further comprising:
a plurality of transversely spaced vertically extending reinforcement rib portions on one side surface of said identification portion; and
said numeric slot means being located between said reinforcement rib means.

24. An animal ear tag assembly for mounting on the ear of an animal of the bovine species or the like which includes an upper ear portion connecting a relatively short length anterior ear lobe portion and a relatively long length posterior ear lobe portion providing an ear pocket therebetween, and the ear tag assembly comprising:
an one piece identification member having a relatively wide vertically extending identification portion located in front of the animal ear and below the anterior ear portion, a tapered intermediate portion connected at one lower end to said identification portion and extending upwardly from said identification portion along and adjacent the outer surface of the anterior ear portion to the upper ear portion, a strap portion of relatively narrow width connected to said intermediate portion and extending vertically downwardly through a slit in the upper ear portion, and an enlarged head portion on the lower end of said strap portion and being located in the ear pocket; and
an one piece attachment member located in the ear pocket and having a central slot means for enabling passage of said head portion therethrough during assembly and abutment means for retaining said head portion and said attachment member in the ear pocket after assembly whereby the tag assembly is permanently attached to the animal ear.

25. The invention as defined in claim 24 and wherein at least one part of said connecting portion:
extends upwardly and rearwardly at an acute angle relative to said identification portion; and
said strap portion having a rectangular cross-sectional configuration integrally connected to said intermediate portion and extending downwardly relative thereto.

26. The invention as defined in claim 25 and further comprising:
resiliently expandable and contractible flange means integrally connected to said attachment member on opposite sides of said slot means for enabling passage of said head portion through said slot means during assembly and for preventing withdrawal of said head portion after passage through said slot means by abutting engagement therewith.

27. The invention as defined in claim 25, wherein:
an upper part of said head portion having a rectangular cross-sectional configuration larger than the rectangular cross-sectional configuration of said strap portion and providing a pair of oppositely spaced upwardly facing abutment shoulder surfaces on opposite sides of said strap portion;
a lower part of said head portion being inwardly tapered relative to said upper part of said head portion and terminating in a reduced width and thickness end portion;
said attachment member having a generally flat relatively rigid body portion and said slot means extending through said body portion and having a generally rectangular peripheral configuration generally corresponding to the rectangular cross-sectional configuration of said strap portion and said upper part of said head portion;
said slot means having an upper opening of larger size than said upper part of said head portion to enable unrestricted passage of said upper part of said head portion therethrough and being defined in part by a pair of oppositely spaced resiliently deflectible flange portions integrally connected to said body portion on opposite sides of said upper inlet opening and extending downwardly and inwardly toward one another and having downwardly facing abutment end surfaces; and
said resiliently deflectible flange portions being resiliently outwardly deflectible between a normal closely spaced position defining a lower opening of smaller size than said upper part of said head portion and an outwardly deflected position defining an opening of sufficient size to enable passage of said upper part of said head portion and said downwardly facing abutment end surfaces on said flange portions being engaged with said upwardly facing abutment shoulder surfaces on said upper part of said head portion after passage through said lower opening to prevent withdrawal of said head portion.

28. The invention as defined in claim 25 and wherein:
said identification portion and said intermediate portion and said strap portion are sufficiently resiliently flexible to enable them to be resiliently deflected into substantial coplanar relationship during an assembly operation.

29. The invention as defined in claim 25 and further comprising:
an identification signal generating means mounted on said identification member for generating a coded animal identification signal.

30. The invention as defined in claim 29 and wherein said identification signal generating means is located on said intermediate portion of said identification member.

31. The invention as defined in claim 29 and further comprising:
visual identification indicia on the front surface of said identification portion of said identification member.

32. The invention as defined in claim 31 and wherein said visual identification indicia comprise slots cut through said identification portion.

33. The invention as defined in claim 29 and further comprising:
identification signal receiving means for receiving said coded animal identification signal from said identification signal generating means only when the head of the animal is located in close proximity to said identification signal receiving means.

* * * * *